United States Patent Office 3,080,694
Patented Mar. 12, 1963

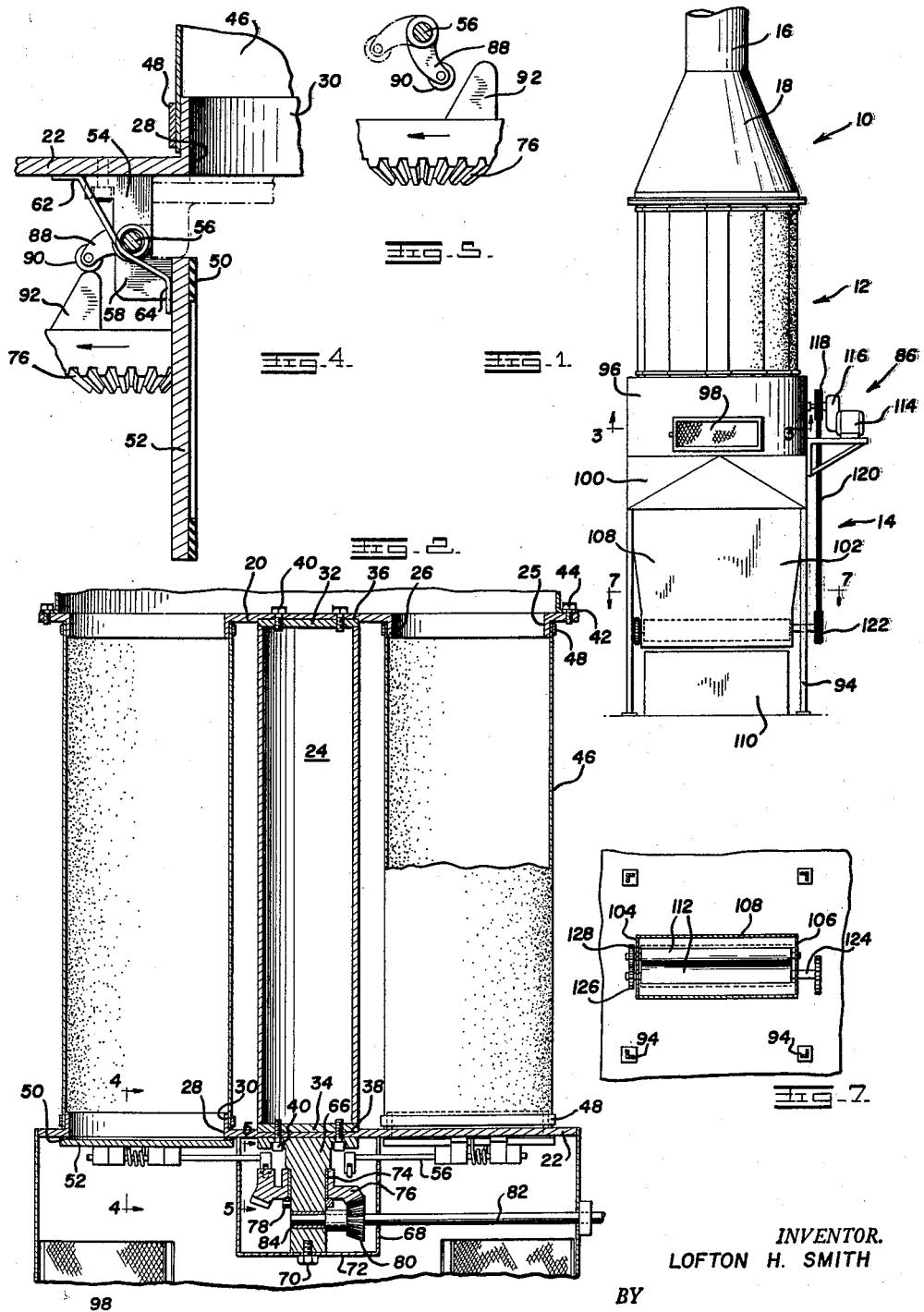

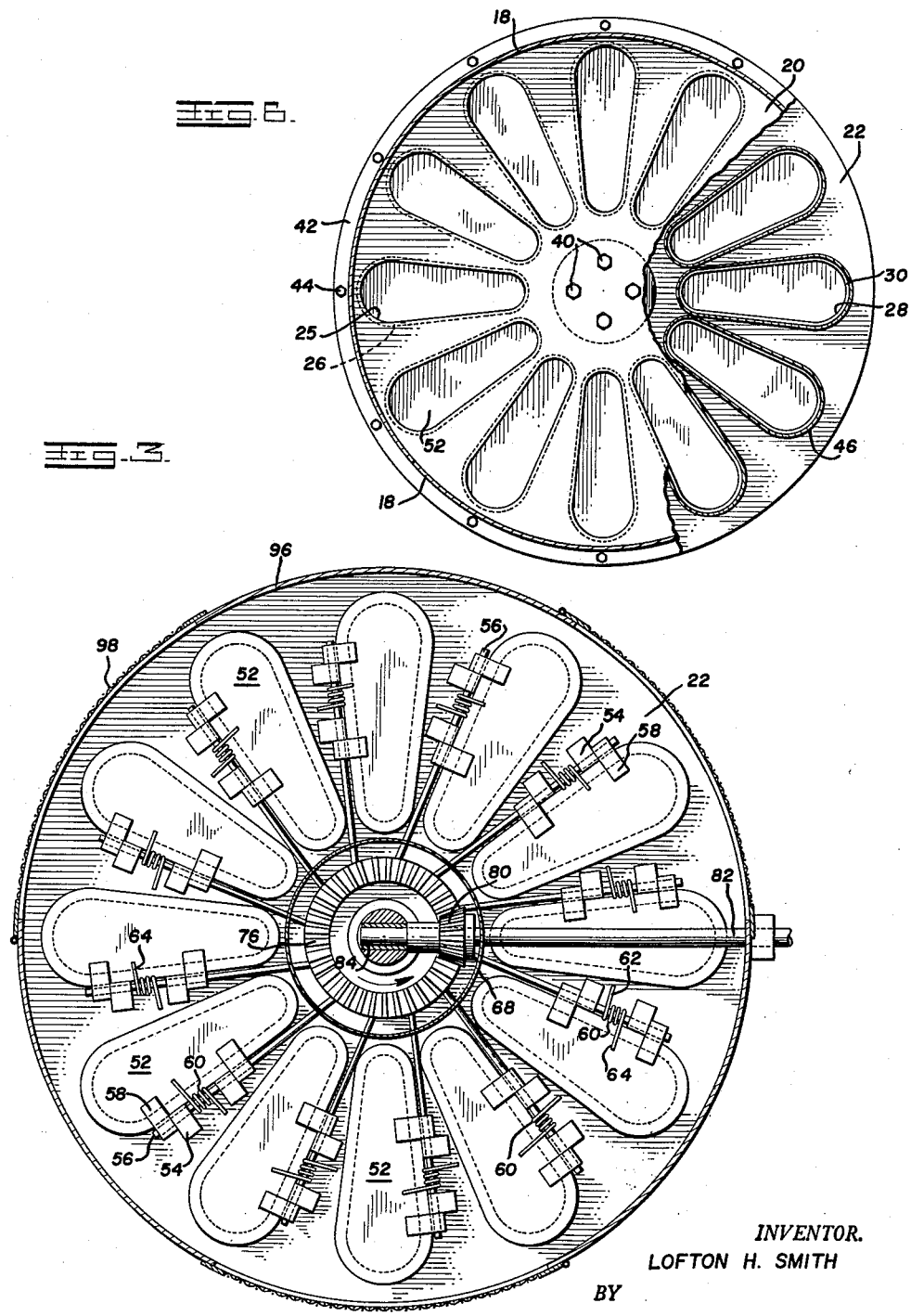

3,080,694
AIR FILTER
Lofton H. Smith, 2164 Collins Drive, NW.,
Atlanta 18, Ga.
Filed June 22, 1959, Ser. No. 821,769
6 Claims. (Cl. 55—284)

This invention relates generally to air filters, and more particularly to apparatus for removing dust and lint from conditioned air, and then recirculating this cleansed air back into the conditioned room from which it was removed.

It is common practice in textile mills, when handling open stock of wool, cotton, or other fibers, to transport the stock from one machine to the next, or from one room to another, via air duct conveyors. Obviously, in order to perform this operation a suction fan and condenser are needed. The suction fan, of course, causes the air drafts in the ducts, while the condenser separates the bulk of textile fiber from the air. However, the screen of the condenser must be fairly coarse so as not to become easily clogged and thus a considerable amount of dust and lint passes through the condenser screen.

Sometime ago a system was used wherein the air discharged from condensers which is polluted with dust, fibers and leafy particles, was discharged into a dust pit or dust chimney, and thence into the atmosphere. The purpose of the pit or chimney, was to allow the dust to settle, because its being discharged directly into the atmosphere is extremely unhealthy for local inhabitants of the area. However, the pit or chimney had to be of similar size as the room from which the dust laden air had arrived. Therefore, the large amount of space necessary proved to be prohibitory. Also, since textile stock must be operated upon in conditioned air, that is, air which has been subjected to a certain temperature and humidity content, it is extremely expensive to discharge this heated and humidified air into the atmosphere.

Accordingly, the air filter was developed to remove the dust and dirt from the air and thence discharge this conditioned air back into the textile mill, so that the benefit of the heated and humidified air would not be lost.

The first recirculating air filters were merely cylindrical screens in which the dust laden air passed, so that dirt would impinge upon the screen and the air could freely pass therethrough. However, the problems with this type of apparatus were numerous, the most obvious being that the passage of air therethrough must periodically cease so that the screen could be cleaned. Therefore, for any sizeable mill, a great number of these filters were necessary, and the down time of the machinery, caused by stopping the air flow to clean the filters, became economically prohibitive.

These factors all led to the recent development of the self cleaning air filter wherein the cleaning operation, that is, the cleaning of dirt or dust from the screens, could be accomplished while the filtering action was taking place. Therefore there was no down time whatsoever, and smaller and fewer air filters were required. However, all of these self cleaning air filters have many disadvantages which are quite costly in large overhead, small markup industries such as the textile industry. The self cleaning air filters almost universally have the inlet for the dust laden air connected to the same chamber into which the dirt and dust removed from the filters is deposited, so that the incoming air creates turbulent drafts within the chamber and the dirt and dust which has been cleaned from the filters is caused to flow along with the incoming air and is therefore redeposited upon the filters.

Furthermore, the dust laden air inlet and the clean air outlet are so poorly arranged that each of the filters do not receive an equal share of air during the process and a main air path is created. This causes the filters located within the main air path to accumulate dirt very quickly, whereas the other portions of the filters hardly collect any dust or dirt at all. This, of course, means very poor efficiency in cleaning operation, and requires large filtering apparatus to be used. In some of these devices there is no provision whatsoever for carrying away the dirt which had been removed from the filters and this dirt builds up in between the filters and thus reduces the amount of filtering surface available.

While all of these disadvantages are considerable, probably the greatest disadvantage of the prior art is the fact that the apparatus is very complicated and bulky, which is in large part caused by the fact that a separate air supply is required for use in the cleaning of the filters. This means that a fan or compressor of some type must be incorporated in the machine to provide air currents of sufficient force to remove the dust and dirt which impinges upon the filters.

With these defects of the prior art in mind, it is the primary object of this invention to provide a self cleaning air filter which is extremely efficient in operation so that an extremely large amount of filtering area, and thus filtering capacity, may be provided in an apparatus which occupies a surprisingly small amount of floor space.

Another object of this invention is to provide apparatus of the character described wherein the dust and dirt laden inlet air is used for the cleaning of filters whereby the necessity for providing large capacity fans and the like is eliminated.

A further object of this invention is to provide a self cleaning air filter of the character described wherein the inlet for the dust laden air is quite remote from the dust collection chamber so that there is no possibility whatsoever for the dust and dirt being recirculated through the filter to decrease the efficiency thereof.

Still another object of the invention is to provide a device of the type described wherein the inlet for the incoming dust laden air and the outlet for the filtered air are centrally arranged with respect to the filters so that there is no main air path through the device, but all of the filtering surfaces perform an equal amount of filtering action.

Yet another object of this invention is to provide means in a dust collection chamber of an air filter which prevents the dirt and dust from backing up into the chamber and interfering with the proper filtering of air through the filters.

The foregoing objects and others ancillary thereto are accomplished according to a preferred embodiment of the invention, wherein the filters are open at both ends, and doors are provided to close the ends of the filter which are remote from the inlet side of the filter so that air passes from the filter directly into the atmosphere without the necessity for being carried through additional passages.

The dust laden inlet conduit feeds a funnel shaped hood which in turn directs the air toward all of the filters simultaneously to assure that the dust laden air is evenly distributed through all of the filters. The doors closing the filter ends are opened periodically by a suitable mechanism so that the dust laden air may pass through the sleeve in a longitudinal direction, that is, into one open end and out the other open end thereof, rather than through the filter proper. Thus the dust laden air removes the dust and dirt from the inside of the filter. A collection chamber is provided below the doors, so that as each of the doors are opened the dust laden air removes the dirt from the filters and carries it down into the collection chamber.

The novel features that are considered characteristic of the invention are set forth with particularity in the appended claims. The invention itself, however, both as to its organization and its method of operation, together with additional objects and advantages thereof, will best be understood from the following description of an embodiment when read in connection with the accompanying drawings, wherein like reference characters indicate like parts throughout the several figures and in which:

FIG. 1 is a side elevational view illustrating the self cleaning air filter;

FIG. 2 is a vertical sectional view taken through the filtering section of the apparatus;

FIG. 3 is an enlarged horizontal sectional view taken substantially along the plane defined by reference line 3—3 of FIG. 1, illustrating the doors which close the lower ends of the filters;

FIG. 4 is a fragmentary vertical sectional view taken substantially along the plane defined by reference line 4—4 of FIG. 2 illustrating the filter door and the operating mechanism as they appear when the door is in the completely opened position;

FIG. 5 is a fragmentary view of the lug and arm which cooperate to open and close the doors;

FIG. 6 is a horizontal sectional view taken through the inlet hood and viewed downwardly, with parts being broken-away for purposes of clarity, and FIG. 7 is a fragmentary horizontal sectional view taken substantially along the plane defined by reference line 7—7 of FIG. 1 illustrating the dust collection rollers which carry the dust and dirt out of the dust collecting chamber.

Referring now in more detail to the drawings, the self cleaning air filtering apparatus is illustrated in FIG. 1 as comprising a dust laden air inlet section 10, which is located at the top of the machine so that the dust laden air will pass through the machine from top to bottom. The air filtering section 12 is disposed immediately below the inlet section, and the dust and dirt collection section is designated as 14 and is disposed below filtering section 12 and acts as a base for supporting the apparatus upon a floor of a mill. It should be noted that since the clean air will flow outwardly through the filtering sleeves of section 12, that the major portion of section 12 is not covered by any plates or housing but is open to the atmosphere so that the air may pass freely through the sleeves. In this respect it should be further noted that the main reinforcing assembly for section 12 will be centrally located, and if necessary, supporting rods may be used about the periphery thereof for additional support.

The dust laden inlet section 10 is of extremely simple construction and includes a conduit 16 which transports the dirt laden air from the condensers which are used in conjunction with the conduits for transporting the stock of textile fiber, and this conduit 16 communicates with an inverted funnel-like hood 18 which is actually the shape of a truncated cone. This hood 18 assures proper dispersion of the air under pressure coming from conduit 16 so that all of the filters will receive approximately the same volume of air.

The filtering section 12 is supported by a main frame which is constructed of a circular upper plate 20, a similarly shaped lower plate 22, with a supporting column 24 disposed vertically therebetween and centrally thereof, so that the frame is the shape of a vertically disposed spool.

A plurality of circularly arranged elongated openings 25 are provided through upper plate 20 with their longitudinal axes disposed as radii of circular plate 20. Each opening 25 has a flange 26 projecting downwardly therefrom so as to define a lip to which the filter elements or sleeves may be connected. The lower frame plate 22 is similarly constructed and has corresponding openings 28 formed therethrough with upwardly projecting lips 30 extending from the peripheral edges of the openings.

The supporting column 24 is provided with ends 32, 34 which may be inserted into small recesses 36 and 38 formed in the central portions of plates 20 and 22 respectively so that column 24 will be properly disposed with respect to the upper and lower plates. Bolts 40 are passed through the upper and lower plates and thence secured to the ends 32 and 34 of support column 24. Thus, a unitary spool shaped frame member is formed.

The hood 18 is provided with a peripheral flange 42 extending from the lower edge thereof so that the hood 18 may be connected to the spool shaped frame member by means of bolts 44 which pass through the flange 42 and into upper plate 20. It should thus be evident that the incoming dust laden air passing from hood 18 will be equally dispersed through each of the openings 25 formed in upper plate 20. The arrangement of the openings 25 out of alignment with the axis of conduit 16 and hood 18 aids in proper air dispersion.

Tubular filters or filter sleeves are connected between lip 26 of upper plate 20 and lip 30 of lower plate 22. The filters 46 are of the same cross sectional shape as the openings and lips and, depending upon the material from which they are made, they may be stretched to fit the lips or may easily slip over the lips and be held thereto by bands 48. The filters 46 may be made of paper, cloth, or in fact, any suitable type of air permeable membrane.

The upper surfaces of doors 52 are provided with a plurality of gaskets 50. These doors 52 are of the same general shape as the openings 28, and are of slightly larger dimensions. They close the openings 28 by engaging the gaskets 50 with the undersurface of plate 22 so that there may be no passage of air through openings 28 while the doors 52 are closed. This ensures that proper filtering will take place through the filters 46.

The doors 52 are mounted to the under surface of lower plate 22 by means of bearings 54 mounted on lower plate 22, shafts 56 which are journaled in the bearings 54 and fixed from sliding movement by any suitable means (not shown). Connecting members 58 are fixed to shafts 56 which are thus fixed to doors 52, so that the doors 52 are pivotally mounted about the axis of shaft 56. Axial springs 60 are disposed about shaft 56 between bearings 54, and have projecting legs 62 and 64 at either end thereof which bear against the lower surface of lower plate 22, and the under surface of doors 52, respectively, so that the doors are spring biased into the closed position.

Downwardly projecting support element 66 is connected to the lower surface of lower plate 22 opposite support column 24 and may be supported by the same bolts 40 which fix support column 24 to the lower plate 22. A cylindrical housing 68 surrounds support element 66 and is attached thereto by means of a bolt 70 which passes through the closed end 72 of housing 68 and into the support element 66.

This support element 66 is provided with a bearing 74 onto which a large bevel gear 76 is rotatably mounted, and is prevented from moving out of position by a collar 78, which is also fixed to support element 66. Large bevel 76 is driven by a small bevel 80 fixed onto a drive shaft 82 which is journaled at 84 to the lower end of support element 66. The outer end of drive shaft 82 is connected with drive means 86 which will be explained below.

The shafts 56 onto which the doors 52 are pivotally mounted, extend through slots in housing 68 and project within the housing. Arms 88 having rollers 90 rotatably mounted on the end thereof, are fixed to the inner ends of shafts 56 and are disposed in a circular arrangement overlying the large bevel 76. This large bevel 76 has a lug 92 projecting therefrom which cooperates with roller 90 on the ends of arms 88, so that as the bevel gear 76 is rotated lug 92 successively engages the rollers 90 of arms 88 and pivot them from the solid line position illustrated in FIG. 5 to the dotted line position illustrated in this figure. By so pivoting the arms 88 the doors 52 which are fixed to shafts 56 also move, and the open position of the doors is illustrated in solid lines in FIG. 4, with the dotted line position illustrating the closed position of the doors.

The dirt collection section 14 of the apparatus is constructed of a frame 94 which serves to not only support the dirt collection section 14 but also the remainder of the apparatus, since frame 94 will seat on the floor. The upper portion of dirt collection section 14 is constructed of a cylindrical casing 96 which is connected at its upper end to lower plate 22. Circumferentially spaced about the periphery of casing 96 and disposed in the walls thereof are a plurality of screens 98, which are removably fixed within the casing. The lower end of casing 96 is connected to a transition member 100 which narrows down into the shape of a truncated four sided pyramid to form a chute 102 which has a rectangular cross section which gradually diminishes toward the lower end thereof.

The lower portion of the chute is defined by end walls 104 and 106, and side walls 108 which form the rectangular cross section of the chute proper. The lower end of the chute is disposed some distance above the floor so that a removable bin 110 may be placed therebelow to collect all of the dust and dirt which flows through the chute. However, in order to prevent any possible back flow of dirt up through the chute, which would interfere with the normal disposal of dust and dirt, a pair of rolls 112 are disposed in the lower end of the chute and close the opening thereof. These rolls rotate in opposite directions so as to conduct dirt from within the chute 102 through the rolls and down into the bin 110.

The drive means 86 comprises a motor 114 driving a gear reduction mechanism 116 into which the outer end of shaft 82 projects. A shaft 82 projects through casing 96 and drives small bevel 80. On the outer end of this shaft a pulley 118 is disposed which drives, through a belt 120, a second pulley 122 which is connected by means of a shaft 124 to one of the rolls 112. The other end of this shaft has a gear 126 fixed thereto which drives a second gear having the same number of teeth, and attached to the shaft of the other roller 112 so that the rollers are driven at the same speed and in opposite directions.

Although the operation of the device should be fairly apparent, a brief explanation thereof follows: The dust and dirt laden air flows through conduit 16, and is then dispersed by means of hood 18 into a greater cross sectional area. This air then passes through filter sleeves 46 and, since the lower end thereof is closed, the air is dispersed through the filter sleeves 46 and thence into the atmosphere. Naturally, the particles of dust and dirt which are in the air cannot pass through the filter and so deposit on the inner walls of the filters. Since this deposit of dirt on the inner walls of sleeves 46 builds up and eventually prevents proper flow through the filters, the self cleaning action is required.

This action comes from the large bevel 76 rotating and moving the lug 92 in a circular path so as to consecutively move arms 88 as designated in FIG. 5, whereupon the doors will, one at a time, open for a short period of time. During the time that the door is open, a portion of the dirt laden air from hood 18 will flow directly through the filter sleeve 46 of the door which is open, and this rush of air will carry the dirt, which has built up in a thin layer on the inner walls of the filter, with it to flow downwardly through opening 28 and into casing 96. This downward rush of air also causes some (slight) vibration of sleeve 46 which also serves to discharge dirt particles which become lodged therein. This air carrying the dirt from the filter flows into casing 96, and is then dispersed through the screens 98, while the dirt is allowed to fall down into chute 102 and is then deposited into bin 110. Thus, periodically the filters are cleaned by the dirt laden air which is then released through screens 98 in casing 96.

If it is desired that a lesser amount of air flow through any sleeve 46 while its door is open, then the screens 98 may be made sufficiently small to limit the amount of air passing into casing 96, or, it should be readily realized that if arm 88 is shortened, then the period of time that door 52 is open will be correspondingly lessened, and in this manner the doors may be kept open for any length of time which is desired.

It should now be apparent that an extremely efficient and practical self cleaning air filtering apparatus has been provided which completely separates the dust and dirt taken from the dust laden air so that there can be no backflow thereof. Furthermore, the cleaning of the filters 46 is extremely efficient, and no separate means for providing air currents are needed, since it is the dirt laden air proper which performs cleaning. In this manner, an apparatus which takes up a very small amount of floor space can perform the same amount of cleaning which had previously required much larger and bulkier machines for the same capacity.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. A self-cleaning dust filtering apparatus comprising a plurality of open-ended dust filtering sleeves, a frame on which said sleeves are mounted, said frame including upper and lower plates having vertically aligned openings therein between which said sleeves are removably disposed, a hood of substantially the same area as said upper plate positioned over the upper plate and having a conical wall tapering upwardly to an air inlet near its upper end, said hood defining an inlet chamber communicating directly with all of said filtering sleeves, a plurality of doors one for each said sleeve pivotally mounted below said lower plate, resilient means positioned below the lower plate urging said doors to close all the openings in said lower plate and leaving said sleeves free for unimpeded air flow therethrough when said doors are opened, a dust collecting chamber below said doors having a side wall and a bottom wall, a dust outlet in the bottom wall of said chamber, at least one screened opening in the side wall of said chamber, and means for opening said doors periodically in sequence so that the dust laden air passes from end to end through each sleeve having its door open and the dust within the sleeve is discharged into the dust collecting chamber whereby cleaning of the filter sleeves takes place during operation of the filtering apparatus and the dust laden air exits through said screened opening in the dust collecting chamber.

2. The apparatus of claim 1 wherein said filtering sleeves are vertically disposed and arranged in a circle, said door mounting means includes a shaft for each door, each shaft projecting into an actuating zone, said door opening means comprising a horizontally disposed gear wheel including a driven element disposed in said zone, and a plurality of arms connected to said shafts in the vicinity of said actuating zone in the path of said driven element so that when an arm is moved by said driven element the corresponding door is opened.

3. The apparatus of claim 1 wherein said dust collecting chamber tapers downwardly and inwardly to form a chute, a removable bin below said chute, a pair of driven rolls in the bottom of said chute below said screens for transferring dust from said chamber to said removable bin and preventing flow of air from the chamber to said bin.

4. A self-cleaning dust filtering apparatus according to claim 1 wherein said filter sleeves are disposed in a horizontal circle, each said sleeve being elongated in cross section in the direction of a radius of said circle and being narrower at its end facing the center of the circle and wider at the other end thereof to provide a greater filter area.

5. A self-cleaning dust filtering apparatus comprising a plurality of vertical dust filter sleeves arranged in a horizontal circle, means disposed at one open end of each of said sleeves for effecting a flow of dust laden air through the sleeves to deposit dust on the sleeve walls and discharge the filtered air directly into the atmosphere, means for periodically removing dust deposited on the sleeve walls by use of the dust laden air including an openable closure arranged at the other end of each filter sleeve, each said closure being hinged on an axis disposed substantially radially of the circle of sleeves, and a dust receiving chamber downstream of the sleeves for receiving dust removed from said filters by said dust removing means and including a plurality of screens for discharging the air passing thereinto to the atmosphere, said screens being disposed in the dust receiving chamber walls adjacent the sleeves whereby when said dust laden air is used to remove dust deposited on the filter walls such air also flows past said screens and removes dust therefrom, the position of the hinge axis of each closure causing the closure to direct the air in a circular sweeping movement across said screens.

6. A self-cleaning dust filtering apparatus comprising in combination a plurality of vertical filter sleeves internally unimpeded and disposed in a horizontal circle, said filter sleeves being elongated in cross section in the directions of radii of said circle with each sleeve being narrower at its end facing the center of the circle and wider at the other end thereof to provide a greater filter area, means for effecting a flow of dust laden air downwardly into the open upper ends of said sleeves and through the walls of said filter sleeves to deposit dust on said walls and discharge the filtered air directly into the atmosphere, said means including a dust laden air inlet including a hood above said filter sleeves and directly communicating with all of the sleeves, means for removing dust deposited on the walls of the filter sleeves including a periodically openable door arranged at the lower end of each filter sleeve, said doors being urged to closed positions by resilient means located below the filter sleeves, said means for removing dust deposited on the walls of the filter sleeves further comprising a horizontally disposed gear wheel below said filter sleeves including a driven element, each of said doors having a shaft arranged above and radially of said gear wheel and extending into the path of said driven element, each of said shafts having an arm adapted to be cammed by said driven element to open the associated door, and means for driving said gear wheel, and a dust receiving chamber below said filter sleeves for receiving dust removed from said sleeves by said dust removing means.

References Cited in the file of this patent

UNITED STATES PATENTS

| 333,217 | Hagenberg | Dec. 29, 1885 |
| 534,068 | Holland | Feb. 12, 1895 |
| 1,206,103 | Goethel | Nov. 28, 1916 |
| 1,349,480 | Wilsmore | Aug. 10, 1920 |
| 1,954,352 | Dornbrook et al. | Apr. 10, 1934 |
| 2,731,107 | Hersey | Jan. 17, 1956 |

FOREIGN PATENTS

| 9,227 | Great Britain | Apr. 23, 1903 |
| 401,186 | Germany | Aug. 29, 1924 |
| 834,636 | Germany | Mar. 20, 1952 |